H. P. GENGEMBRE.
Process of Extracting Oil, &c., from Minerals.
No. 52,283. Patented Jan'y 30, 1866.
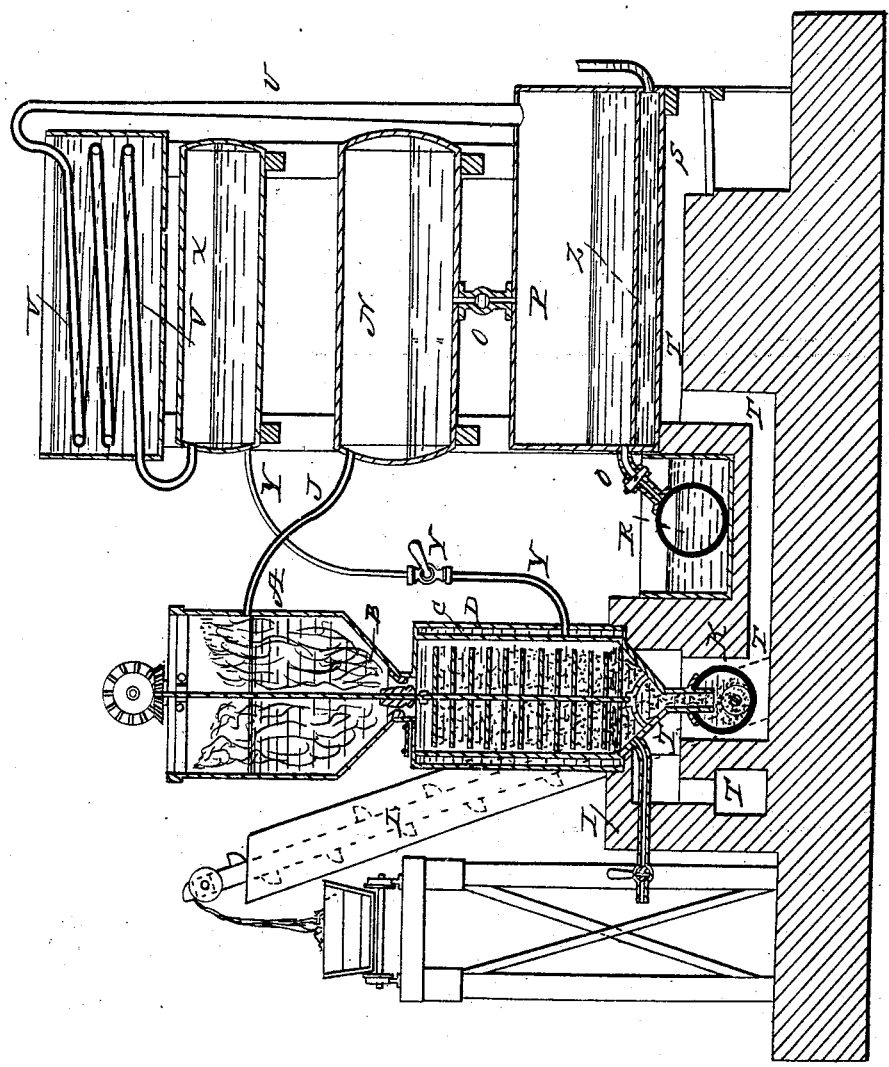
WITNESSES:
INVENTOR:

UNITED STATES PATENT OFFICE.

H. P. GENGEMBRE, OF PITTSBURG, PENNSYLVANIA.

IMPROVED PROCESS FOR EXTRACTING OILS, &c., FROM MINERALS.

Specification forming part of Letters Patent No. 52,283, dated January 30, 1866.

*To all whom it may concern:*

Be it known that I, H. P. GENGEMBRE, of Pittsburg, in the county of Allegheny and State of Pennsylvania, have invented a new and Improved Process for Extracting Oils, Paraffine, or Bitumens from Minerals Containing the same; and I do hereby declare that the following is a full and exact description thereof, reference being had to the accompanying drawings, forming part of this specification, and which represents one of the apparatus which can be used for carrying out my process, seen in sectional elevation through the center of the apparatus to illustrate more fully its working parts.

My invention consists in an improved process for extracting oils, paraffine, or bitumens from minerals containing the same without submitting said minerals to the process of distillation, whereby I obtain all the oils, paraffine, or bitumens in their natural state, not altered by the heat of the distillating process, and whereby I avoid the loss of part of the oils, paraffine, or bitumen occasioned by part of said hydrocarbons being converted into permanent gases, as is the case in all the processes of distillation now in use.

My process can be described as follows:

First, I submit the mineral to the action of light liquid hydrocarbons, in a liquid state or in vapor, in the manner more fully described below. This dissolves all the oils, paraffines, and bitumens contained in the mineral.

Secondly, I treat the mineral with water or with an aqueous solution of mineral salt or salts, in the manner more fully described further, for the purpose of separating the spent mineral from the light liquid hydrocarbon holding in solution all the oils, paraffine, and bitumen extracted from the mineral.

Thirdly, I submit the liquor resulting from the above treatments, which liquor consists of oils, paraffine, and bitumens dissolved in the light liquid hydrocarbon first used, to the process of distillation to separate and recover the solvent or light liquid hydrocarbon and concentrate or crystallize the oils, paraffine, or bitumens which were held in solution in the light liquid hydrocarbon.

The following is the description of an apparatus in which my process can be carried out:

A is a vessel in which the mineral is submitted to the action of the solvent.

B is the crusher which divides the particles of the mineral to facilitate the action of the solvent.

C is a vessel in which the small particles of mineral are agitated in the solvent to extract the last portion of oils, paraffine, or bitumens therein contained. The vessel C is provided with suitable apparatus for retarding the fall of the small particles of mineral and agitating them in the solvent. The vessel C has a steam-jacket, D, and is otherwise provided with means of being heated. The lower part of the vessel C is filled with water or with an aqueous solution of mineral salt or salts, and it is so constructed as to allow of the small particles of spent mineral being removed by mechanical means, (illustrated by the pipe K and elevator L.) It has also a steam-pipe, I, for introducing at pleasure naked steam into the reservoir or vessel C.

X is a reservoir containing the solvent; Y, a pipe leading from the reservoir X to the vessel C; N, a tank to receive the saturated solvent from the vessel A through the pipe J. P is a still for constant distillations at a given temperature by means of the bath Z. O is the cock or valve for filling the still P; Q, the cock for emptying the still P. R is the tank for receiving the oils, paraffine, or bitumens; U, the vapor-pipe of the still; V, the worm; and S T T is the furnace and smoke-flues.

The above-described apparatus will answer the purpose; but many modifications can be made without changing the general principle of working; and I do not claim here any special apparatus, but will use any apparatus in which I can best carry out my process.

The operation of the above apparatus to obtain the results aimed at in my process is as follows: The mineral, previously reduced to lumps of the proper size, is thrown into the vessel A until it is full. A certain quantity of water or solution of salt, or salts in water, is introduced into the elevator L, pipe K, and vessel C, and the cock Y is open to allow the solvent from the receiver X to run down in the vessel C and come up in the vessel A until it overflows by the pipe J, when the cock Y is shut and the apparatus allowed to stand for a short time, allowing steam to enter by the pipe I, and also in the steam-jacket D, to heat the water and the solvent in the vessel C. When the apparatus has attained the proper heat, which must vary according to the nature of the mineral to be treated and the character of the solvent used, the machinery is put into motion, and the cock Y is again open, and will now remain so. The mineral softened by the action of the solvent on the oils, bitumens, and paraffine contained in it will be easily ground by the crusher B and reduced to small particles, which fall into the vessel C, where they are washed in the fresh solvent constantly arriving, and as these small particles proceed downward by their own weight they lose all their oils, paraffine, or bitumen, and arrive at the bottom, where they touch the water or aqueous solution of mineral salt or salts—the small particles of mineral now exposed to the action of the aqueous solution of salt or to the water in a boiling state. There they will be stripped from all the solvent which was adhering to them and fall into the apparatus K, in which they are carried out of the apparatus. As the mineral sinks down in the vessel A it is kept full by new mineral, and the process now goes on in a continuous manner, the solvent, saturated with oils, paraffine, or bitumen, accumulating in the reservoir N. When the receiver N is full it is emptied into the still P by the cock O without stopping the operation, and when the still is full the cock O is shut. The distillation in the still is pushed on rapidly to drive off the solvent or light hydrocarbon which ascends in vapor by the pipe U, is condensed in the worm V, and returns to the tank X, to be used again over and over. By the time the distillation is terminated the reservoir N is full again, but the oils, paraffine, or bitumens remaining in the still are run out by the cock Q into the cooler R, and the still P is again ready for receiving the contents of the reservoir N.

The advantages of my process are obvious.

First, by not submitting the mineral to distillation, which requires a temperature of 700° to 900° Fahrenheit, I save the wear and tear of apparatus, expense of fuel, risk of fire, loss of products by formation of permanent gases, expensive apparatus, and length of time necessary to raise such large body of mineral to a high temperature.

Secondly, I obtain the oils, paraffine, or bitumens in their natural state or condition with all their lubricating properties.

Thirdly, without any extra expense or trouble I can, at will, obtain the products in a higher or lower degree of concentration than they exist in the mineral.

Fourthly, the expense of the apparatus and of working it is less than any other now in use.

Although my process is described as a continuous one, and that I prefer that mode of working, if it is desirable to work it alternatively, it can be done without being for that another process.

What I claim, and desire to secure by Letters Patent of the United States, is—

1. Extracting oils, paraffine, or bitumens from minerals containing the same by submitting said minerals to the action of light liquid hydrocarbons in a liquid state or in vapor for the purpose of dissolving the oils, paraffine, or bitumen therein contained.

2. Treating the spent mineral with water or with an aqueous solution of mineral salt or salts for the purpose of separating the spent mineral from the light liquid hydrocarbons, oils, paraffine, or bitumen.

3. Recovering the light liquid hydrocarbon by the process specified and using it over and over for subsequent operations.

4. The combination of the downward motion of the mineral with the upward motion of the solvent in the vessels A and C, as described, and for the purpose specified.

5. The application of mechanical power to divide the particles of mineral after they have soaked in the solvent and without taking them out of the same, in the manner specified.

H. P. GENGEMBRE. [L. S.]

Witnesses:
 A. T. HENRY,
 WILLIAM GERHARDT.